(12) United States Patent
Lee (10) Patent No.: US 9,811,195 B2
(45) Date of Patent: Nov. 7, 2017

(54) TOUCH SCREEN WITH SOFT KEY ENABLING ELECTROMAGNETIC RESONANCE INPUT

(75) Inventor: Joo-Hoon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 348 days.

(21) Appl. No.: 13/544,378

(22) Filed: Jul. 9, 2012

(65) Prior Publication Data
US 2013/0016064 A1   Jan. 17, 2013

(30) Foreign Application Priority Data
Jul. 12, 2011 (KR) .................. 10-2011-0069165

(51) Int. Cl.
*G06F 3/041* (2006.01)
*G06F 3/044* (2006.01)
*G06F 3/046* (2006.01)

(52) U.S. Cl.
CPC ............ *G06F 3/0416* (2013.01); *G06F 3/044* (2013.01); *G06F 3/046* (2013.01); *G06F 2203/04106* (2013.01)

(58) Field of Classification Search
CPC ........ G06F 3/0416; G06F 3/046; G06F 3/044; G06F 2203/04106
USPC ............ 345/173–174, 87; 340/573; 381/388; 178/18.01–18.02
See application file for complete search history.

(56) References Cited

U.S. PATENT DOCUMENTS

| | | | |
|---|---|---|---|
| 2004/0105040 A1* | 6/2004 | Oh | G02F 1/13338 349/12 |
| 2005/0156912 A1 | 7/2005 | Taylor et al. | |
| 2006/0075250 A1* | 4/2006 | Liao | H04M 1/72519 713/182 |
| 2006/0109252 A1 | 5/2006 | Kolmykov-Zotov et al. | |
| 2009/0113295 A1* | 4/2009 | Halpern et al. | 715/273 |
| 2010/0001967 A1* | 1/2010 | Yoo | 345/173 |

(Continued)

FOREIGN PATENT DOCUMENTS

| | | |
|---|---|---|
| CN | 1501317 | 6/2004 |
| CN | 201247458 | 5/2009 |

(Continued)

OTHER PUBLICATIONS

Chinese Office Action dated May 6, 2016 issued in counterpart application No. 201210241643.6, 18 pages.

(Continued)

*Primary Examiner* — Shaheda Abdin
(74) *Attorney, Agent, or Firm* — The Farrell Law Firm, P.C.

(57) ABSTRACT

A touch screen and a method for controlling the touch screen are provided. The touch screen includes a user interface including a display area and at least one soft key; a touch sensor unit disposed under the display area and the at least one soft key of the user interface, for sensing a touch on the display area or the at least one soft key; a display unit disposed under the touch sensor unit, for outputting a display screen; a first electromagnetic sensor unit disposed under the display unit, for sensing an electromagnetic field incident on the display area; and a second electromagnetic sensor unit physically separated from the first electromagnetic sensor unit, for sensing at least one electromagnetic field incident on the at least one soft key.

21 Claims, 10 Drawing Sheets

(56) References Cited

U.S. PATENT DOCUMENTS

| | | | |
|---|---|---|---|
| 2010/0156843 A1* | 6/2010 | Paleczny et al. | 345/174 |
| 2010/0222148 A1* | 9/2010 | Kuhn et al. | 463/46 |
| 2010/0227651 A1* | 9/2010 | Kim | G06F 3/1423 455/566 |
| 2011/0043491 A1* | 2/2011 | Oh | 345/177 |
| 2011/0050619 A1 | 3/2011 | Griffin | |
| 2011/0053653 A1* | 3/2011 | Tho et al. | 455/566 |
| 2011/0069022 A1 | 3/2011 | Yokota et al. | |
| 2011/0084933 A1 | 4/2011 | Curtis et al. | |
| 2011/0216032 A1* | 9/2011 | Oda | G06F 3/044 345/174 |
| 2011/0260987 A1* | 10/2011 | Zhao | G02F 1/13 345/173 |
| 2012/0274600 A1* | 11/2012 | Yeung | G06F 3/03547 345/174 |
| 2012/0306927 A1* | 12/2012 | Lee et al. | 345/660 |

FOREIGN PATENT DOCUMENTS

| | | |
|---|---|---|
| EP | 2 169 923 | 3/2010 |
| JP | 2008-084222 | 4/2008 |
| KR | 1020030004612 | 1/2003 |
| KR | 1020060057518 | 5/2006 |
| KR | 1020060128835 | 12/2006 |

OTHER PUBLICATIONS

Korean Office Action dated Mar. 14, 2017 issued in counterpart application No. 10-2011-0069165, 12 pages.
European Search Report dated May 8, 2017 issued in counterpart application No. 12176119.1-1507, 10 pages.

* cited by examiner

TOUCH SCREEN WITH SOFT KEY ENABLING ELECTROMAGNETIC RESONANCE INPUT

PRIORITY

This application claims priority under 35 U.S.C. §119(a) to a Korean Patent Application filed in the Korean Intellectual Property Office on Jul. 12, 2011 and assigned Serial No. 10-2011-0069165, the entire contents of which are incorporated herein by reference.

BACKGROUND OF THE INVENTION

1. Field of the Invention

The present invention relates generally to a touch screen with a soft key and more particularly, to a touch screen with a soft key enabling electromagnetic resonance input.

2. Description of the Related Art

Along with the recent rapid growth of the market for smart phones and touch screens, extensive research has been conducted for these products. A user can input a specific command to a smart phone or other device having a touch screen by selecting a specific position or icon on the display of the smart phone or touch screen with a user's body part or with an ElectroMagnetic Resonance (EMR) pen.

This input scheme can be implemented through a capacitive touch screen. A capacitive touch screen generally includes transparent electrodes and condensers. As the user touches the touch screen with a body part, the touch may be sensed based on the resulting changed capacity of a condenser.

However, since a capacitive touch screen requires a user's touch, this input scheme may be inconvenient for a user and providing accurate input may be difficult. Due to this inconvenience, EMR input has recently become an active study area.

An EMR type input on a touch screen involves controlling generation of electromagnetic waves by applying a voltage to a loop coil disposed on a Printed Circuit Board (PCB) and controlling absorption of the electromagnetic waves into an EMR pen. The EMR pen may include a condenser and a loop and emit the absorbed electromagnetic waves in a specific frequency.

The electromagnetic waves emitted from the EMR pen may be absorbed again into the loop coil of the PCB so that a position near to the EMR pen on the touch screen can be determined based on the absorbed electromagnetic waves.

Meanwhile, a pen may operate in an ElectroMagnetic (EM) fashion as well in the EMR fashion. An EM pen may include a coil for electromagnetic output and an internal power supply for applying a voltage to the coil.

Figure 1A:
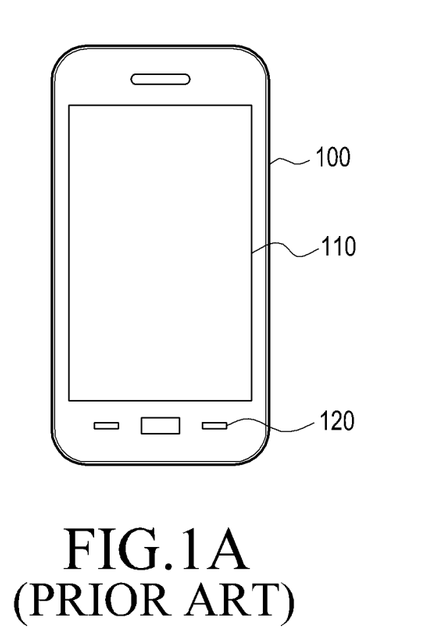
FIGS. 1A, 1B and 1C are diagrams illustrating a conventional ElectroMagnetic Resonance (EMR) scheme.
Figure 1B:
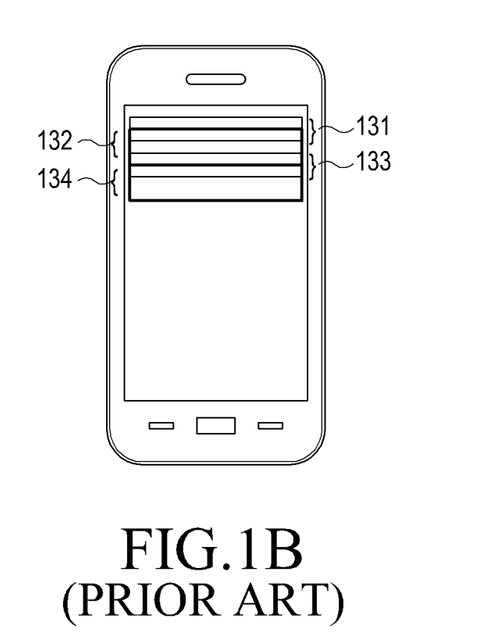
Figure 1C:
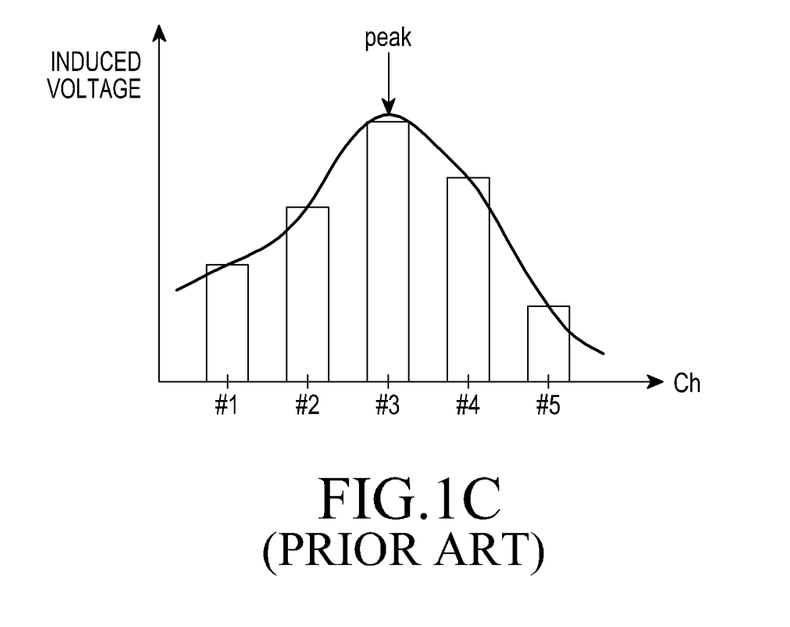

FIGS. 1A, 1B and 1C are conceptual views of a conventional EMR scheme.

FIG. 1A is a diagram illustrating a communication device 100 with an electromagnetic sensing circuit operating in a conventional EMR scheme.

Referring to FIG. 1A, the communication device 100 may include a display 110 and soft keys 120.

The display 110 displays information to a user. The display 110 may operate in an EMR scheme and/or a capacitive scheme.

The soft keys 120 are a user interface provided separately from the display 110, which enables the user to intuitively perform basic functions such as back, cancel, menu display control, etc. Conventionally, the soft keys 120 operate only in the capacitive scheme due to limitations on accommodation of capacitive sensors and electromagnetic sensors under transparent electrodes. Conventional soft keys do not have built-in electromagnetic sensors.

FIG. 1B is a diagram illustrating a plurality of loops arranged in the display of FIG. 1.

Referring to FIG. 1B, a plurality of loops 131 to 134 may be arranged such that the loops overlap with each other. When the user's an EMR pen is moved close to a specific position on the display 110, the loops 131 to 134 may sense an electromagnetic field from the EMR pen.

FIG. 1C is a graph illustrating induced voltage with respect to the loops of the display of FIG. 1B.

Referring to FIG. 1C, each of the loops 131 to 134 may output current induced by the sensed electromagnetic field. A loop closer to the EMR pen will sense an electromagnetic wave with a larger amplitude than loops further away from the EMR pen, and each loop will emit an induced voltage corresponding to the sensed electromagnetic wave. Therefore, induced voltages with different magnitudes may be output as illustrated in FIG. 1C.

A microprocessor built in the communication device 100 may determine a peak by interpolating the magnitudes of the output induced voltages and thus may determine a user-input position on the display.

As stated before, since only the capacitive scheme is used for the soft keys 120, the user must input commands to the soft keys 120 by touching the soft keys 120 with a body part. Moreover, when the user's body part touches a soft key 120, while using an EMR pen, an unintended input such as execution of a back operation through a corresponding soft key may occur. Accordingly, there exists a need for developing a structure for disabling user input via a touch on the soft keys 120, when a user uses an EMR pen.

SUMMARY OF THE INVENTION

An object of the present invention is to address at least the problems and/or disadvantages and to provide at least the advantages described below. Accordingly, an aspect of embodiments of the present invention is to provide a touch screen with a soft key that enables input of a specific command by ElectroMagnetic Resonance (EMR).

In accordance with an embodiment of the present invention, a touch screen is provided. The touch screen includes a user interface including a display area and at least one soft key; a touch sensor unit disposed under the display area and the at least one soft key of the user interface, for sensing a touch on the display area or the at least one soft key; a display unit disposed under the touch sensor unit, for outputting a display screen; a first electromagnetic sensor unit disposed under the display unit, for sensing an electromagnetic field incident on the display area; and a second electromagnetic sensor unit physically separated from the first electromagnetic sensor unit, for sensing at least one electromagnetic field incident on the at least one soft key.

In accordance with another embodiment of the present invention, a touch screen is provided. The touch screen includes a user interface including a display area and at least one soft key; a touch sensor unit disposed under the display area of the user interface, for sensing a touch on the display area; a display unit disposed under the first touch sensor unit, for outputting a display screen; a first electromagnetic sensor unit disposed under the display unit, for sensing an electromagnetic field incident on the display area; and a sensor unit physically apart from the first electromagnetic sensor unit, for sensing at least one an electromagnetic field incident on the at least one soft key and a touch on the at least one soft key.

In accordance with a further embodiment of the present invention, a method, performed by an electronic device including a touch screen that has a display area and at least one soft key and is capable of sensing a touch and an electromagnetic field, for controlling the touch screen is provided. The method includes determining whether a touch input locking command has been received; and disabling touch sensing of the display area and the at least one soft key and enabling electromagnetic sensing of the display area and the at least one soft key, upon receipt of the touch input locking command.

BRIEF DESCRIPTION OF THE DRAWINGS

The above and other objects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein may be omitted for the sake of clarity and conciseness.

Figure 2:
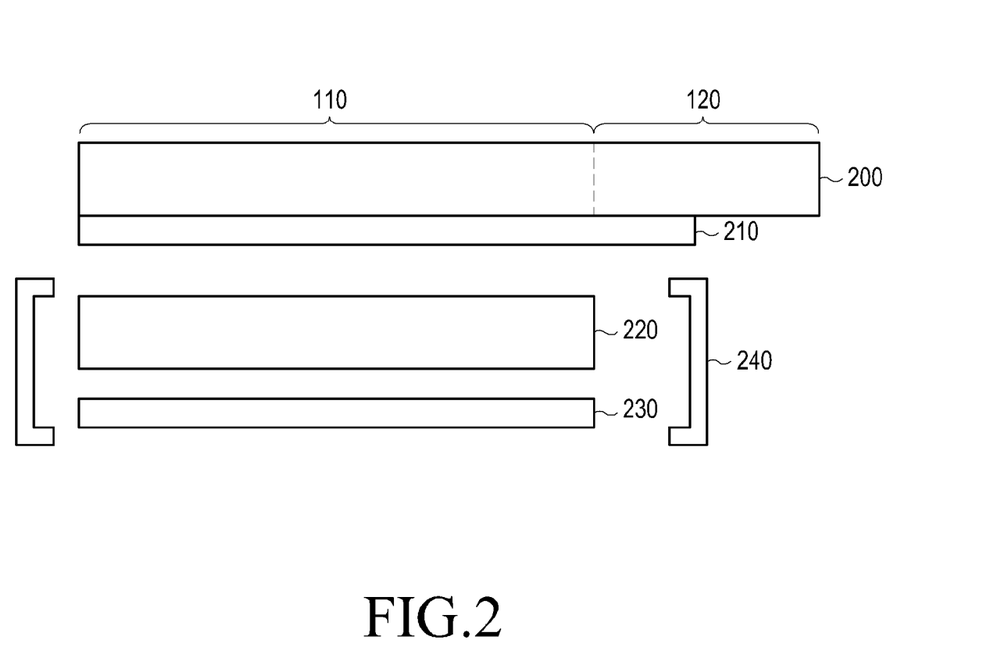
FIG. 2 is a diagram illustrating a sectional view of a touch screen as a comparative example.

FIG. 2 is a diagram illustrating a sectional view of a touch screen as a comparative example.

Referring to FIG. 2, the touch screen as a comparative example includes an interface 200, a touch sensor unit 210, a display 220, and an electromagnetic sensor 230. The interface 200 may include a display area 110 and at least one soft key 120.

For firm engagement, the touch screen includes an additional fastener 240. Therefore, the size of the electromagnetic sensor 230 may not be larger than that of the display 220. Since there is no electromagnetic sensor for the soft key 120, the soft key 120 may operate only in a capacitive manner.

Figure 3:
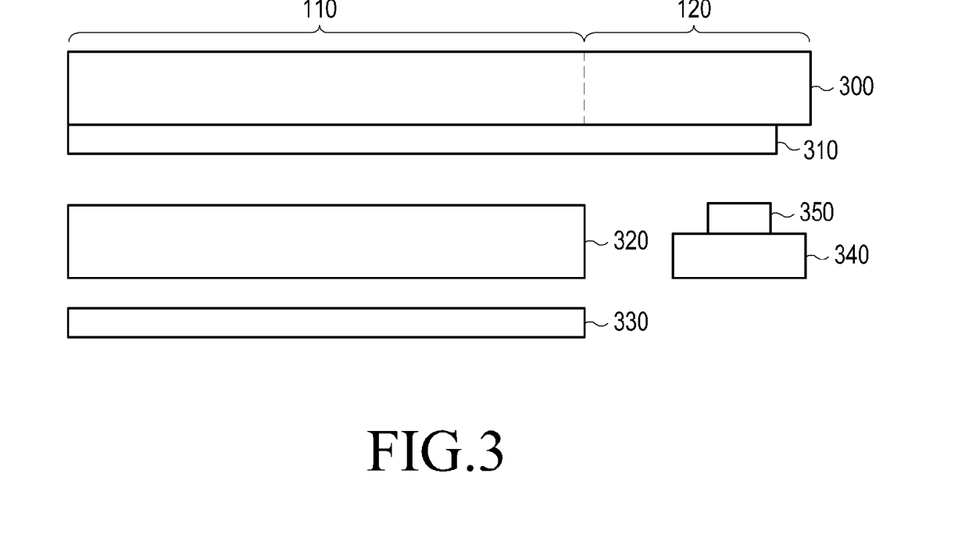
FIG. 3 is a diagram illustrating a sectional view of a touch screen according to an embodiment of the present invention.

FIG. 3 is a diagram illustrating a sectional view of a touch screen according to an embodiment of the present invention.

Referring to FIG. 3, the touch screen may include an interface 300, a touch sensor unit 310, a display 320, a first electromagnetic sensor unit 330, a second electromagnetic sensor unit 340, and a light emitter unit 350.

The interface 300 may be a window glass. In order for the interface 300 to accommodate internal components of the touch screen and to allow a display screen from the display 320 to penetrate through it as well, the interface 300 may be formed of a transparent material. In addition, the interface 300 may be formed of a non-magnetic material and/or formed without a magnetic shield component in order to allow transfer of an incident electromagnetic field to the first or second electromagnetic sensor unit 330 or 340. The interface 300 may be formed of glass, Poly Methyl Methacrylate (PMMA), polycarbonate, etc. Alternatively, a part of the interface 300 may be formed of transparent glass, while another part of the interface 300 may be formed of opaque glass.

The interface 300 may include the display area 110 and at least one soft key 120.

The touch sensor unit 310 senses an external touch. The touch sensor unit 310 may adopt a capacitive scheme for sensing the external touch. The touch sensor unit 310 may include transparent electrodes and Capacitive-Type (C-type) touch sensors. When a user's body part touches the interface 300, the touch sensor unit 310 senses the touch. The touch sensor unit 310 may be implemented as a Touch Sensing Panel (TSP).

The touch sensor unit 310 is disposed near to the bottom surface of the interface 300. The touch sensor unit 310 is mounted on the bottom surface of the display area 110 and a part of the bottom surface of the soft key 120. Accordingly, the touch sensor unit 310 is able to sense a touch on the display area 110 or the soft key 120.

The display 320 is disposed near the bottom surface of the touch sensor unit 310. More particularly, the display 320 is near the bottom surface of the part of the touch sensor 310 corresponding to the display area 110 of the interface 300.

The display 320 receives an external control signal or graphical signal and outputs a display screen corresponding to the control signal or graphic signal. While the display 320 may be a Liquid Crystal Display (LCD) module, it will be clearly understood to those skilled in the art that embodiments of the present invention is not limited to any specific type of the display 320.

The first electromagnetic sensor unit 330 senses a magnetic field incident through the interface 300 and determines a user-selected position based on the sensed magnetic field. The detailed structure of the first electromagnetic sensor unit 330 is similar to that described herein with reference to FIG. 1B.

More specifically, the first electromagnetic sensor unit 330 may include a first Printed Circuit Board (PCB), a first controller having at least one Input/Output (I/O) channel, for controlling electromagnetic sensing of the first electromagnetic sensor unit 330, and at least one first loop unit extended from the at least one I/O channel of the first controller on a part of the first PCB, for detecting a pen signal, similar to corresponding elements shown in FIG. 1B. The first electromagnetic sensor unit 330 may be referred to as a coordinate extraction area in that the first electromagnetic sensor unit 330 senses a position indicated by a pen.

When a specific electromagnetic field is incident, the first loop unit may output an induced voltage and the controller may receive the induced voltage and determine a user-selected position based on the induced voltage.

The first electromagnetic sensor unit 330 is disposed near to the bottom surface of the display 320. As described before in relation to the comparative example, the first electromagnetic sensor unit 330 may be as large as the display 320, to order to allow firm engagement of the entire touch screen. Accordingly, the first electromagnetic sensor unit 330 may sense only an electromagnetic field incident on the display area 110 of the interface 300, without sensing an electromagnetic field incident on the soft key 120.

The second electromagnetic sensor unit 340 is disposed under the soft key 120 of the interface 300 and senses an electromagnetic field incident on the soft key 120. The second electromagnetic sensor unit 340 may be physically apart from the first electromagnetic sensor unit 330 and sense an electromagnetic field incident on the soft key 120 without affecting the engagement of the whole touch screen.

More specifically, the second electromagnetic sensor unit 340 may include a second PCB including at least one sub-area corresponding to the at least one soft key 120, a second controller having at least one Input/Output (I/O) channel, for controlling electromagnetic sensing of the second electromagnetic sensor unit 340, and at least one second loop unit extended from the at least I/O channel of the second controller on the at least one sub-area of the second PCB, for outputting a voltage induced by an electromagnetic field (not shown). The number of second loops may be equal to the number of soft keys, and arranged at positions corresponding to the soft keys. The second loop units may be referred to as an on/off detection area in that the second loop units detect selection of specific soft keys, but do not detect an accurate position indicated by a pen, significantly beyond that required in order to determine which specific soft keys are selected.

When a specific electromagnetic field is incident on a soft key 120, the second loop units may output induced voltages according to the electromagnetic field and the second controller may identify the user-selected soft key based on the induced voltages. For example, the second controller may identify, as a user-selected loop unit, a second loop unit having a largest magnitude from among the magnitudes of induced voltages output from the at least one second loop unit, and accordingly identify the user-selected soft key.

The light emitter unit 350 is disposed under a part of the interface 300 corresponding to the at least one soft key 120. For example, if the touch screen includes four soft keys, the light emitter unit 350 may include four light emitters arranged under the interface 300 having the four soft keys, for illuminating the four soft keys.

Although the light emitter unit 350 may be configured with Light Emitting Diodes (LEDs), embodiments of the present invention are not limited to any specific type of the light emitter unit 350, and other types of lighting devices may be used in accordance with embodiments of the present invention.

When the second electromagnetic sensor unit 340 determines a user-selected soft key, the light emitter unit 350 emits light to illuminate the user-selected soft key. For example, if the touch screen includes first to fourth soft keys and the second electromagnetic sensor unit 340 determines the second soft key as selected by a user, the light emitter unit 350is controlled to illuminate the second soft key.

Since the touch screen further includes the second electromagnetic sensor unit 340 that can sense an electromagnetic field incident on a soft key without affecting engagement of the whole touch screen, the user can select a soft key by an electromagnetic input as well as a touch input.

Figure 4:
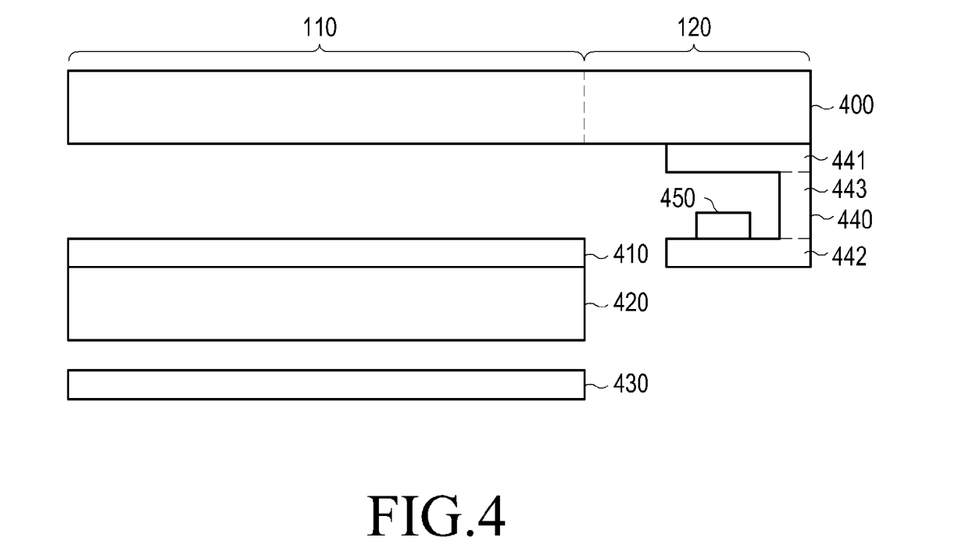
FIG. 4 is a diagram illustrating a sectional view of a touch screen according to another embodiment of the present invention.

FIG. 4 is a diagram illustrating a sectional view of a touch screen according to another embodiment of the present invention.

Referring to FIG. 4, the touch screen include an interface 400, a first touch sensor unit 410, a display 420, a first electromagnetic sensor unit 430, a sensor unit 440, and a light emitter unit 450. Components that are the same or similar to corresponding components of the touch screen illustrated in FIG. 3 may not be described again with respect to FIG. 4, or may be described briefly.

The first touch sensor unit 410 is mounted on the bottom surface of the display area 110 of the interface 400. The touch screen illustrated in FIG. 4 differs from the touch screen illustrated in FIG. 3 in that the first touch sensor unit 410 senses a touch input to the display area 110, but does not sense a touch input to the at least one soft key 120. Therefore, the first touch sensor unit 410 independently senses a touch on the display area 110.

The display 420 is mounted on the bottom surface of the first touch sensor unit 410. As described above, since the first touch sensor unit 410 senses only a touch on the display area 110, the size of the first touch sensor unit 410 may be about equal to the size of the display 420.

The first electromagnetic sensor unit 430 is mounted on the bottom surface of the display 420. The first electromagnetic sensor unit 430 senses an electromagnetic field input to the display area 110 and the size of the first electromagnetic sensor unit 430 may be about equal to the size of the display 420.

The sensor unit 440 is mounted on the bottom surface of the soft key 120. The sensor unit 440 includes a second touch sensor unit 441 for sensing a touch on the at least one soft key 120, a second electromagnetic sensor unit 442 for sensing an electromagnetic field incident on the at least one soft key 120, and a controller 443 for controlling the second touch sensor unit 441 and the second electromagnetic sensor unit 442. Meanwhile, the touch screen may further include a connector for connecting the second touch sensor unit 441 to the second electromagnetic sensor unit 442.

According to the embodiment of the present invention illustrated in FIG. 4, the second touch sensor unit 441 and the second electromagnetic sensor unit 442 may be physically incorporated. As illustrated in FIG. 4, the second touch sensor unit 441 is mounted on the bottom surface of the at least one soft key 120 of the interface 300. The second electromagnetic sensor unit 442 is connected from below to the second touch sensor unit 441. To sense a variation in capacitance, the second touch sensor unit 441 is positioned closer to the interface 300 than the second electromagnetic sensor unit 442.

The light emitter unit 450 is mounted on the top surface of the second electromagnetic sensor unit 442, and accordingly is positioned under the second touch sensor unit 441. As stated before with reference to FIG. 3, when the second touch sensor unit 441 or the second electromagnetic sensor unit 442 identifies a user-input soft key, the light emitter unit 450 is controlled to illuminate the user-input soft key.

Since the touch screen further includes the second electromagnetic sensor unit 442 that can sense an electromagnetic field incident on a soft key without affecting engagement of the whole touch screen, the user can select a soft key by an electromagnetic input as well as a touch input.

Figure 5A:
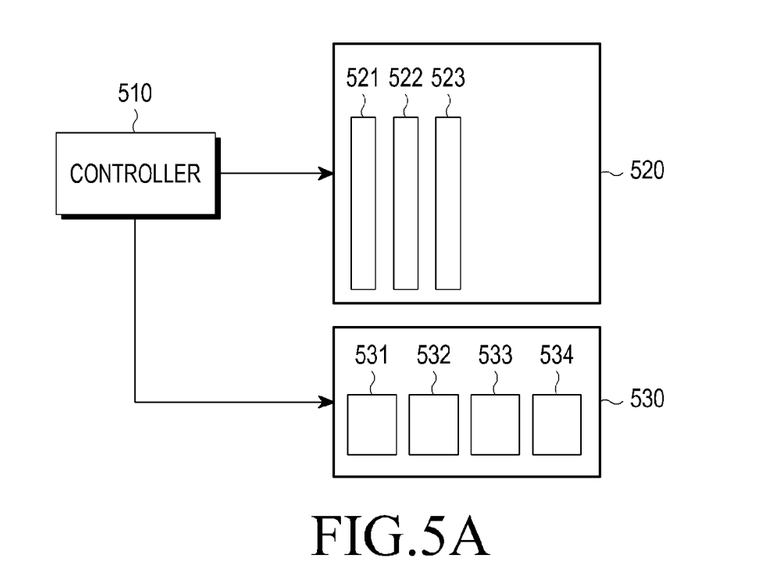
FIG. 5A is a diagram illustrating a connection relationship among a controller, a display area loop unit, and a soft key loop unit according to an embodiment of the present invention.

FIG. 5A is a diagram illustrating a connection relationship among a controller, a display area loop unit, and a soft key loop unit according to an embodiment of the present invention.

Referring to FIG. 5A, a controller 510 may receive induced voltages from a display loop unit 520 and a soft key loop unit 530 and determine a user-selected loop unit based on the induced voltages. The controller 510 may determine a loop unit that outputs an induced voltage with a largest magnitude as a user-selected loop unit.

For example, if a second soft key loop unit 532 included in the soft key loop unit 530 outputs an induced voltage with a largest magnitude, the controller 510 may determine that the user has selected a second soft key using an electromagnetic tool such as an EMR pen.

While the controller 510 is shown in FIG. 5A as physically apart from the display area loop unit 520 and the soft key loop unit 530, a control circuit such as a microprocessor may be mounted in the display area loop unit 520 and thus the controller 510 and the display area loop unit 520 or the controller 510 and the soft key loop unit 530 may be physically incorporated.

Figure 5B:
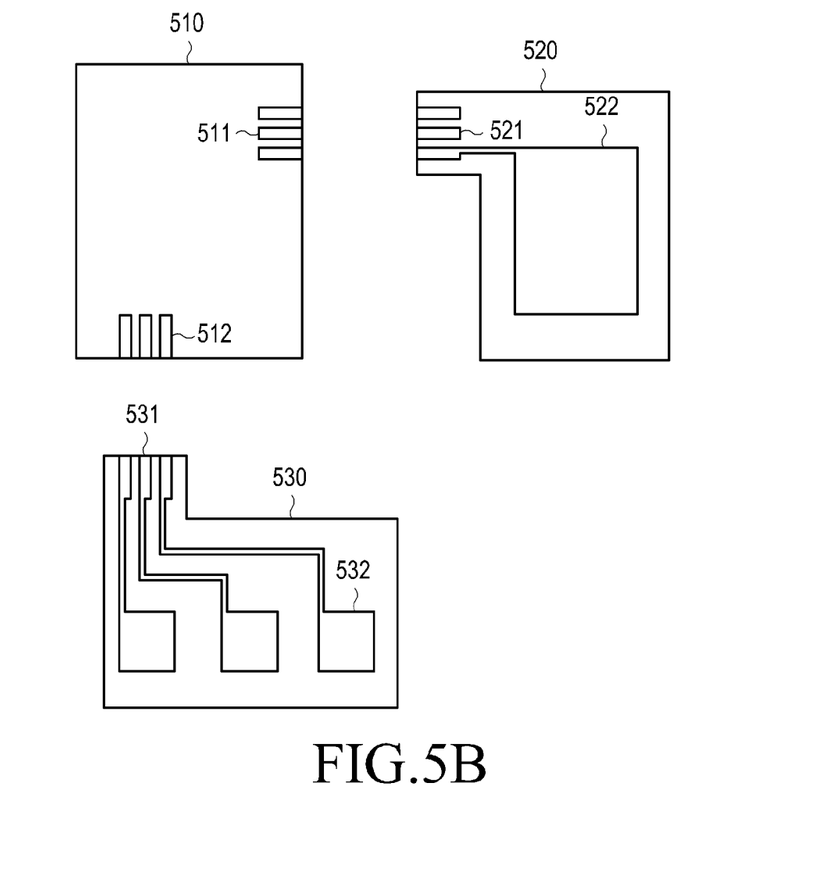
FIG. 5B is a diagram illustrating a connection relationship among the controller, the display area loop unit, and the soft key loop unit according to another embodiment of the present invention.

FIG. 5B is a diagram illustrating a connection relationship among the controller, the display area loop unit, and the soft key loop unit according to another embodiment of the present invention.

Referring to FIG. 5B, the controller 510, the display area loop unit 520, and the soft key loop unit 530 may be implemented in the form of chips integrated on PCBs.

The controller 510 may include a first connector 511 for connecting to the display area loop unit 520 and a second connector 512 for connecting to the soft key loop unit 530. While the first and second connectors 511 and 512 may be shaped into gold fingers, embodiments of the present invention are not limited to this specific configuration of the connectors 511 and 512, and other configurations may be used in accordance with embodiments of the present invention. While not shown, a chip such as a microprocessor may be mounted on the controller 510, such that the chip is used for determining a user-selected soft key based on the magnitude of an induced voltage that each loop unit provides to the first and second connectors 511 and 512.

The display area loop unit 520 is disposed according to the position of the display area of the touch screen and includes a loop unit 522. When a specific electromagnetic field is incident on the display area, the display area loop unit 520 outputs an induced voltage from the loop unit 522 to a connector 521. The connector 521 outputs the received induced voltage to the first connector 511.

The soft key loop unit 530 is disposed according to the positions of soft keys in the touch screen and includes loop units 532. When a specific electromagnetic field is incident on a soft key, the soft key loop unit 530 outputs induced voltages from the loop units 532 to a connector 531. The connector 531 outputs the received induced voltages to the second connector 512.

Figure 5C:
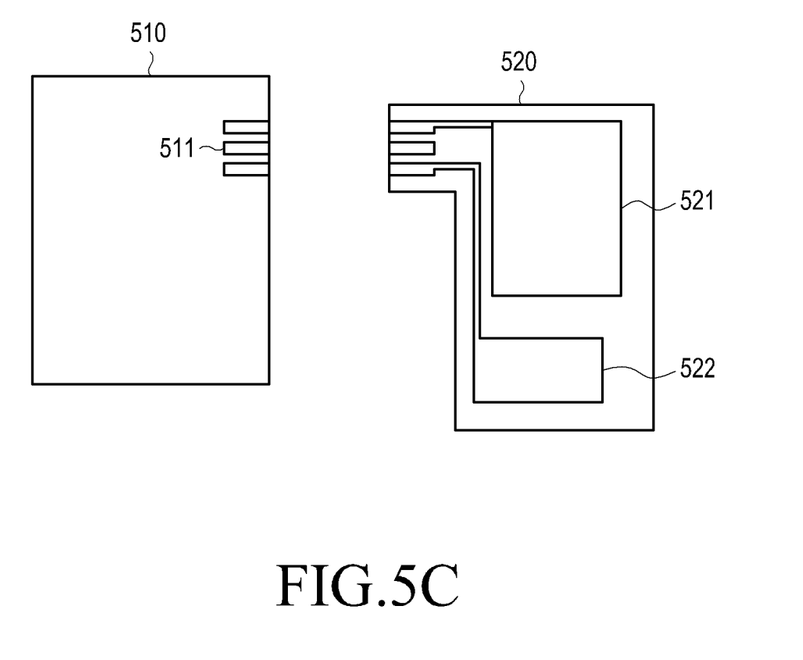
FIG. 5C is a diagram illustrating a connection relationship among the controller, the display area loop unit, and the soft key loop unit according to a further embodiment of the present invention.

FIG. 5C is a diagram illustrating a connection relationship among the controller, the display area loop unit, and the soft key loop unit according to another embodiment of the present invention.

In a manner similar to that shown with reference to FIG. 5B, in the connection relationship according to FIG. 5C, the display area loop unit 521 and the soft key loop unit 522 are arranged on the same PCB. However, in contrast to FIG. 5B, the display area loop unit 521 and the soft key loop unit 522 of FIG. 5C use independent channels, and therefore, induced voltages output from the display area loop unit 521 and the soft key loop unit 522 may be processed independently.

Figure 6A:
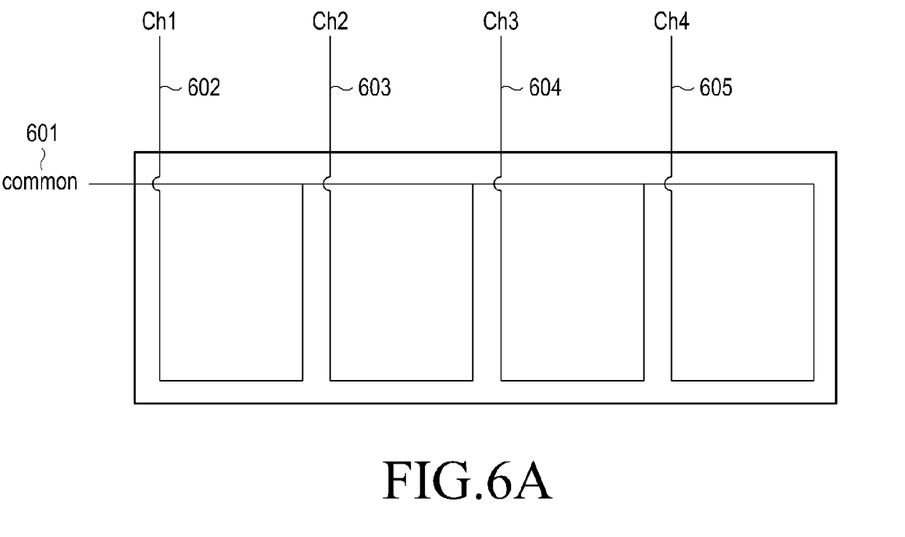
FIGS. 6A and 6B are diagrams illustrating a structure for conducting a voltage for electromagnetic induction and a structure for conducting induced voltages according to embodiments of the present invention.
Figure 6B:
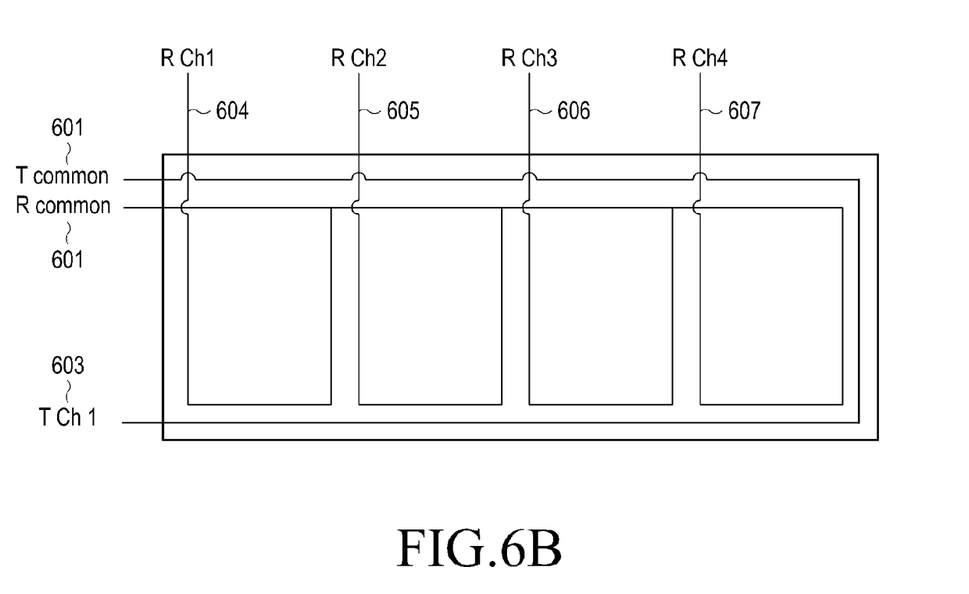

FIGS. 6A and 6B are diagrams illustrating a structure for conducting a voltage for electromagnetic induction and a structure for conducting induced voltages according to embodiments of the present invention.

FIG. 6A is a diagram illustrating a plurality of loop units 602, 603, 604, and 605 for conducting current for electromagnetic induction and conducting induced voltages. The plurality of loops 602, 603, 604, and 605 are arranged at positions corresponding to respective soft keys.

A controller (not shown), which is connected to the plurality of loops 602, 603, 604 and 605 and controls electromagnetic sensing, uses the plurality of loops 602, 603, 604, and 605 as current conduction means by conducting a predetermined current through the loops. The controller also uses the plurality of loops 602, 603, 604, and 605 as induced voltage conduction means by discontinuing a current conduction during a first time period and receiving an induced voltage from one of the loops 602, 603, 604, and 605 during a second time period.

More specifically, the controller may use the plurality of loops 602, 603, 604, and 605 as current conduction means or induced voltage conduction means in time division.

FIG. 6B is a diagram illustrating a plurality of loops for conducting current for electromagnetic induction and conducting induced voltages and an output loop unit arranged on a PCB, through which the current for electromagnetic induction flows, according to an embodiment of the present invention. The plurality of loops 604, 605, 606 and 607 are arranged at positions corresponding to respective soft keys.

The plurality of loops 604, 605, 606, and 607 and the output loop unit 603 are connected to a controller. The controller conducts a predetermined current for electromagnetic induction through the output loop unit and receives induced voltages from the plurality of loops 604, 605, 606, and 607.

Figure 7:
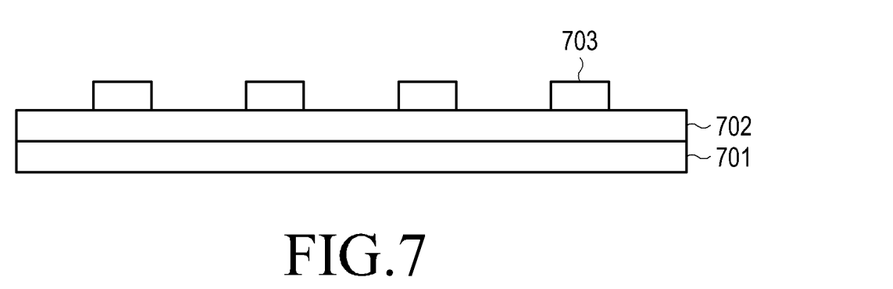
FIGS. 7 is a diagram illustrating a touch screen having an electromagnetic shield according to an embodiment of the present invention.

FIG. 7 is a diagram illustrating a touch screen having an electromagnetic shield according to an embodiment of the present invention.

Referring to FIG. 7, a light emitter unit 703 is mounted on a second electromagnetic sensor unit 702 having the configuration illustrated in FIG. 3. Since an external magnetic field may cause signal distortion to the touch screen after the second electromagnetic sensor unit 702 senses an electromagnetic field, the touch screen may further include an electromagnetic shield 701 under the second electromagnetic sensor unit 702.

The electromagnetic shield 701 prevents magnetic field disturbance. For example, the electromagnetic shield 701 may prevent magnetic field disturbance caused by an Eddy current at a conductive metal.

Figure 8A:
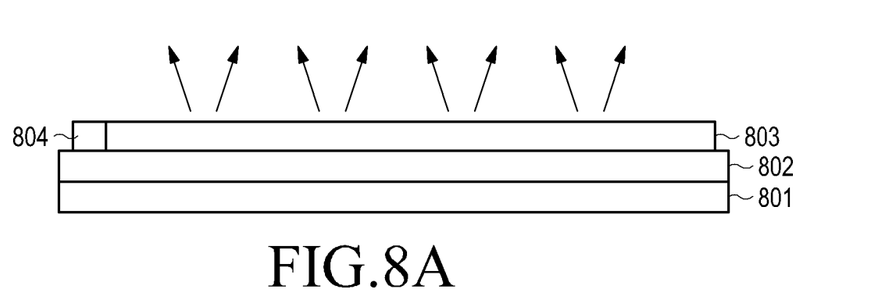
FIGS. 8A and 8B are diagrams illustrating a touch screen further having a light guide according to an embodiment of the present invention.
Figure 8B:
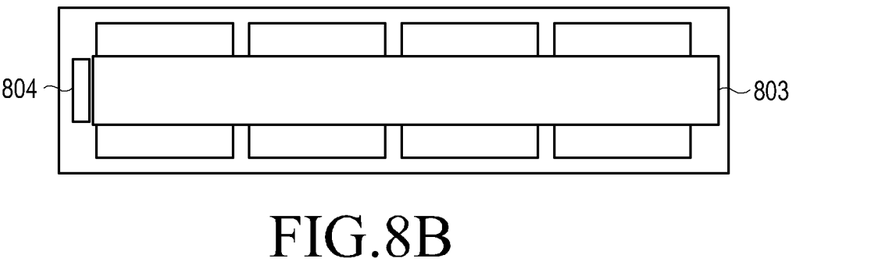

FIGS. 8A and 8B are diagrams illustrating a touch screen further having a light guide according to an embodiment of the present invention.

Referring to FIGS. 8A and 8B, a second electromagnetic sensor unit 802 is mounted on an electromagnetic shield 801 and a light emitter unit 804 is mounted on the second electromagnetic sensor unit 802. The touch screen further includes a light guide 803 near one side of the light emitter unit 804 on the second electromagnetic sensor unit 802.

Therefore, the touch screen may illuminate a soft key using the light emitter unit 804 having a single light emitter and the light guide 803, instead of using the same number of light emitters as the number of soft keys.

Figure 9A:
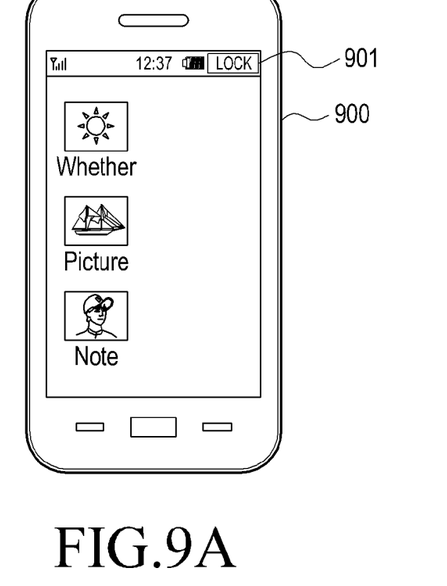
FIGS. 9A, 9B and 9C are diagrams illustrating touch input locking and touch input unlocking according to an embodiment of the present invention.
Figure 9B:
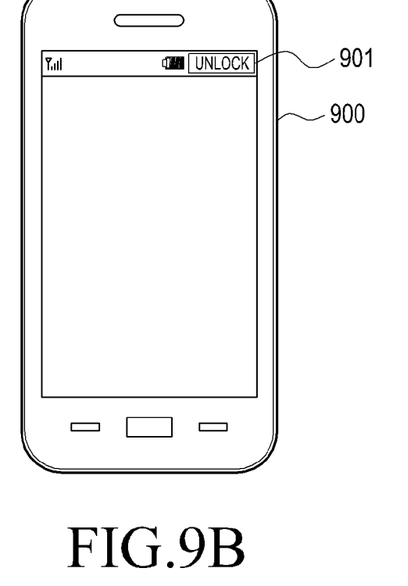
Figure 9C:
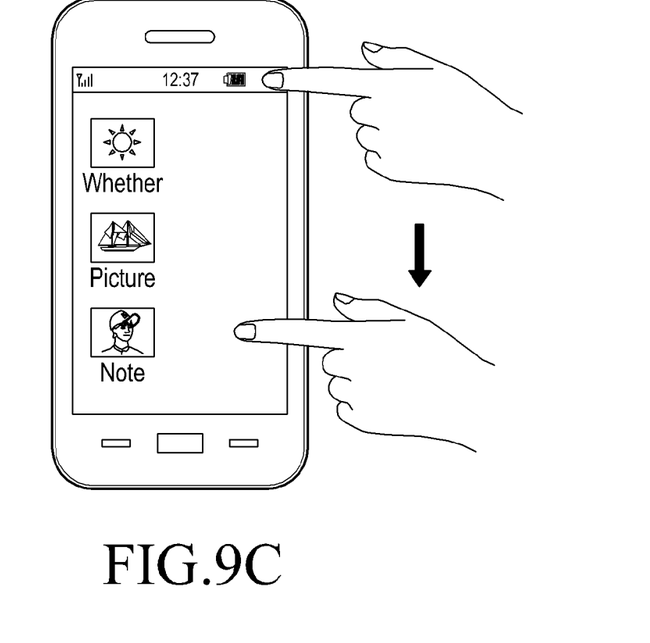

FIGS. 9A, 9B and 9C are diagrams illustrating touch input locking and touch input unlocking according to an embodiment of the present invention.

Referring to FIG. 9A, an icon 901 corresponding to a touch input locking command is displayed in a display area. A user executes the touch input locking command by touching the icon 901 or applying a specific electromagnetic input to the icon 901.

When the touch input locking command is executed, a touch screen 900 disables touch sensing of the display area and touch sensing of at least one soft key, while enabling electromagnetic sensing of both the display area and the at least one soft key.

FIG. 9B is a diagram illustrating a screen displayed on the touch screen 900, after the touch input locking command is executed. In the locked state, the icon 901 set to "Lock" illustrated in FIG. 9A is changed to "Unlock".

The user may unlock the locked state of touch input by selecting the "Unlock" icon 901. Upon selection of the "Unlock" icon 901, the touch screen 900 enables touch sensing of the display area and the at least one soft key.

Since touch sensing of the display area and the at least one soft key has been disabled, the user selects the icon 901 in FIG. 9B using an electromagnetic tool such as an EMR pen. According to another embodiment of the present invention, if the touch screen 900 disables touch sensing of the remaining area except for the icon 901, touch sensing of the icon 901 remains enabled, the user may unlock the locked touch sensing by selecting the icon 901 through a touch input as well as an electromagnetic input.

FIG. 9C is a diagram illustrating an operation for enabling touch sensing according to another embodiment of the present invention.

Referring to FIG. 9C, in a state where touch sensing is disabled, the user enables touch sensing by making a predetermined motion such as touching an upper end of the display area and dragging the touch with a user's body part, such as a fingertip. Thus, the user may unlock touch sensing later through a touch input as well as an electromagnetic input. Meanwhile, the touch screen may provide a menu screen with a touch enable icon through a predetermined operation as described above, and, upon selection of the icon, the touch screen may enable touch sensing.

Figure 10:
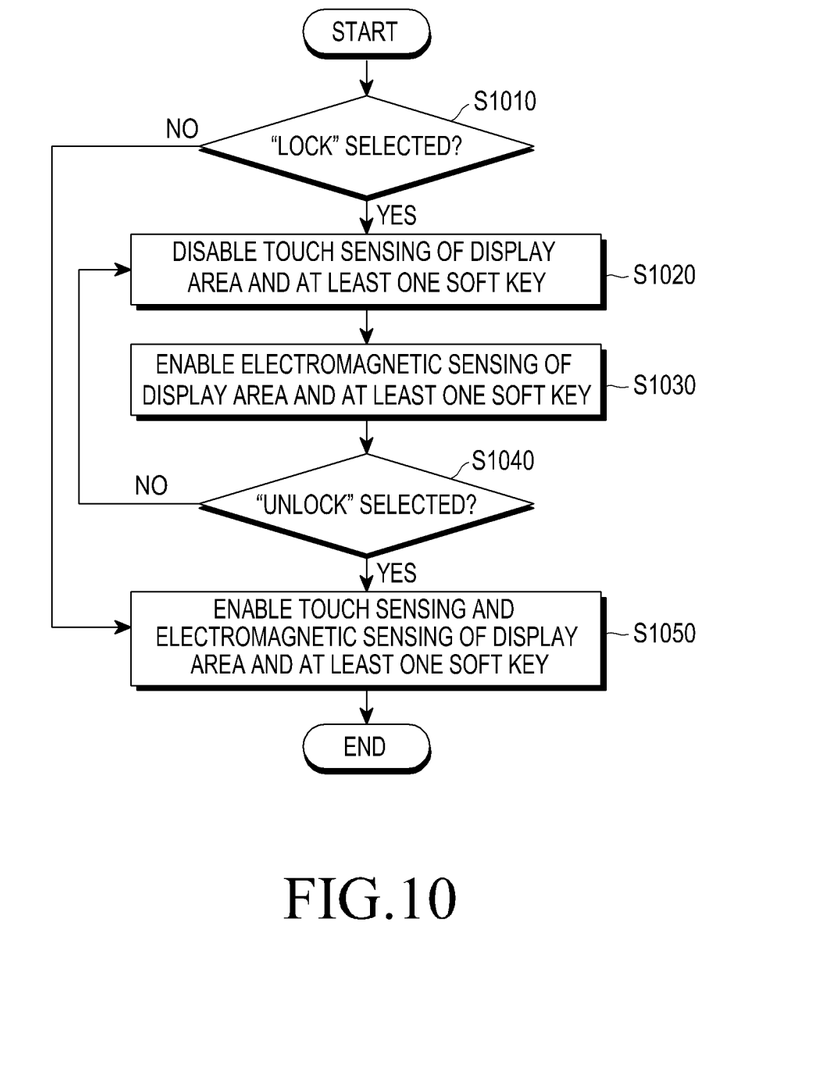
FIG. 10 is a flowchart illustrating a method for controlling a touch screen having a display and at least one soft key, which can sense a touch and an electromagnetic field according to an embodiment of the present invention.

FIG. 10 is a flowchart illustrating a method for controlling a touch screen having a display area and at least one soft key, which can sense a touch and an electromagnetic field according to an embodiment of the present invention.

Referring to FIG. 10, the touch screen determines whether a touch input locking command has been received, in step S1010.

Upon receiving the touch input locking command, the touch screen disables touch sensing of the display area and at least one soft key, in step S1020 and enables electromagnetic sensing of the display area and the at least one soft key, in step S1030.

Subsequently, the touch screen determines whether a touch input unlocking command has been received, in step S1040.

Upon receiving the touch input unlocking command, the touch screen enables touch sensing of the display area and the at least one soft key, in step S1050.

The touch input locking command may be generated by touching or applying an electromagnetic field to a predetermined part of the display area. In addition to, or as an alternative to applying the electromagnetic field, the touch input unlocking command may be generated by applying an electromagnetic field to a predetermined part of the display area.

However, touch sensing of the remaining area except for at least one specific part of the display area may be disabled in the step of disabling touch sensing of the display area and the at least one soft key. In this case, the touch input unlocking command may be generated by touching or applying an electromagnetic field to the specific part of the display area.

Figure 11:
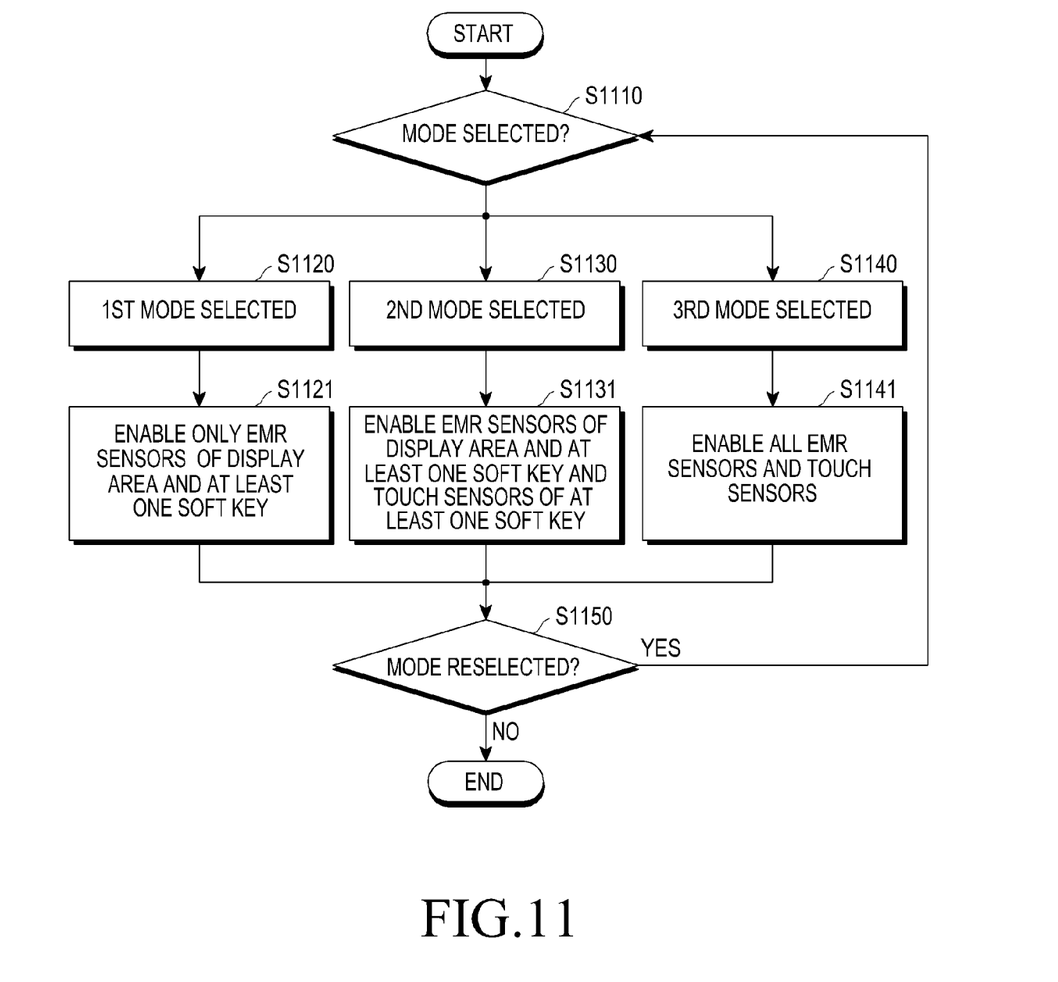
FIG. 11 is a flowchart illustrating a method for selecting a mode for enabling/disabling EMR sensors and touch sensors according to an embodiment of the present invention.

FIG. 11 is a flowchart illustrating a method for selecting a mode for enabling/disabling EMR sensors and touch sensors according to an embodiment of the present invention.

Referring to FIG. 11, the user selects one of a first, second, or third mode. The user may select a menu corresponding to an intended mode displayed on the touch screen. Alternatively, the user may be provided with a mode selection screen by making a predetermined motion as described before with reference to FIG. 9C and may select a mode on the mode selection menu, in step S1110.

Upon selection of the first mode, in step S1120, the touch screen enables EMR sensors of the display area and the soft key area, while disabling touch sensors of the display area and the soft key area, in step S1121.

Upon selection of the second mode, in step S1130, the touch screen enables the EMR sensors of the display area and the soft key area, while enabling the touch sensors of the display area and disabling the touch sensors of the soft key area, in step S1131.

Upon selection of the third mode, in step S1140, the touch screen enables all of the EMR sensors, in step S1141.

In step S1150, the user may reselect a mode by selecting a menu or making a predetermined motion as described above. Therefore, the user may control an input scheme for the touch screen, while selecting various modes.

As is apparent from the above description of embodiments of the present invention, a touch screen having a soft key that enables a specific command input through electromagnetic resonance can be provided. Since a soft key can operate in both of capacitive and electromagnetic resonance schemes in a touch screen according to embodiments of the present invention, a specific position may be selected on the touch screen by a touch input or an electromagnetic input. In addition, the touch input function of a soft key can be disabled via input of a touch input locking command. Therefore, an EMR pen can be used without interference from a touch detected on a soft key.

While the present invention has been shown and described with reference to embodiments thereof, it will be understood by those of ordinary skill in the art that various changes in form and details may be made therein without departing from the spirit and scope of the present invention as defined by the following claims.

What is claimed is:

1. A touch screen comprising:
   a user interface including a display area and at least one soft key, wherein the display area and the at least one soft key are in different sections of the user interface;
   a touch sensor unit disposed under the display area and the at least one soft key of the user interface, for sensing a touch on the display area or the at least one soft key;
   a display unit disposed under the touch sensor unit, for outputting a display screen;
   a first electromagnetic sensor unit disposed under the display unit, for sensing an electromagnetic field incident on the display area by using a plurality of first loop units included in the first electromagnetic sensor unit, wherein each of the plurality of first loop units is overlapped with each other; and
   a second electromagnetic sensor unit physically separated from the first electromagnetic sensor unit, for sensing at least one electromagnetic field incident on the at least one soft key by using at least one second loop unit included in the second electromagnetic unit, wherein the at least one second loop unit is disposed at a position corresponding to the at least one soft key.

2. The touch screen of claim 1, wherein the first electromagnetic sensor unit includes:
   a first Printed Circuit Board (PCB); and
   at least one Input/Output (I/O) channel of a controller configured to control electromagnetic sensing of the first electromagnetic sensor unit,
   wherein the plurality of first loop units are disposed on a part of the first PCB, and extend from the at least one I/O channel, for outputting a voltage induced by the electromagnetic field.

3. The touch screen of claim 1, wherein the second electromagnetic sensor unit comprises:
   a second Printed Circuit Board (PCB) including at least one sub-area, each sub-area corresponding to one of the at least one soft key; and
   at least one Input/Output (I/O) channel of a controller configured to control electromagnetic sensing of the second electromagnetic sensor unit,
   wherein the at least one each second loop unit is disposed on one sub-area of the second PCB and extended from the at least one I/O channel, for outputting a voltage induced by the electromagnetic field.

4. The touch screen of claim 3, wherein a predetermined current is conducted through the at least one second loop unit during a first time period, to discontinue current conduction during a second time period.

5. The touch screen of claim 3, wherein the second electromagnetic sensor unit further comprises a driving loop unit disposed on the second PCB, for receiving a driving voltage for electromagnetic induction,
   wherein the at least one second loop unit senses an electromagnetic field.

6. The touch screen of claim 1, wherein when the user interface receives a touch input locking command, the touch sensor unit is disabled.

7. The touch screen of claim 6, wherein when the user interface receives a touch input unlocking command, the touch sensor unit is enabled.

8. The touch screen of claim 1, further comprising a light emitter unit disposed under the at least one soft key of the user interface, for emitting light,
   wherein the light emitter unit illuminates a touched soft key.

9. A touch screen comprising:
   a user interface including a display area and at least one soft key, wherein the display area and the at least one soft key are in different sections of the user interface;
   a touch sensor unit disposed under the display area of the user interface, for sensing a touch on the display area;
   a display unit disposed under the first touch sensor unit, for outputting a display screen;
   a first electromagnetic sensor unit disposed under the display unit, for sensing an electromagnetic field incident on the display area by using a plurality of first loop units included in the first electromagnetic sensor unit, wherein each of the plurality of first loop units is overlapped with each other; and
   a sensor unit physically apart from the first electromagnetic sensor unit, for sensing at least one an electromagnetic field incident on the at least one soft key by using at least one second loop unit included in the sensor unit, and a touch on the at least one soft key, wherein the at least one second loop unit is disposed at a position corresponding to the at least one soft key.

10. The touch screen of claim 9, wherein the sensor unit includes:
    a second touch sensor unit for sensing a touch on the at least one soft key;
    a second electromagnetic sensor unit for sensing an electromagnetic field incident on the at least one soft key; and
    a controller for controlling the second touch sensor unit and the second electromagnetic sensor unit.

11. The touch screen of claim 10, wherein the controller includes:
    a first sub-controller for controlling the second touch sensor unit; and
    a second sub-controller for controlling the second electromagnetic sensor unit,
    wherein the second touch sensor and the second electromagnetic sensor are controlled independently.

12. The touch screen of claim 10, wherein when the user interface receives a touch input locking command, the first and second touch sensor units are disabled.

13. The touch screen of claim 10, wherein when the user interface receives a touch input unlocking command, the first and second touch sensor units are enabled.

14. The touch screen of claim 9, wherein the sensor unit includes:
    a second touch sensor disposed near to a bottom surface of the at least one soft key of the user interface;
    a second electromagnetic sensor unit disposed under the second touch sensor unit; and
    a connector for connecting the second touch sensor to the second electromagnetic sensor unit.

15. The touch sensor of claim 14, further comprising a light emitter unit disposed on a top surface of the second electromagnetic sensor unit under the second touch sensor, for emitting light.

16. A method, performed by an electronic device including a touch screen that has a display area and at least one soft key and is capable of sensing a touch and an electromagnetic field, for controlling the touch screen, the method comprising:
    determining whether a touch input locking command has been received; and
    disabling touch sensing of the display area and the at least one soft key and enabling electromagnetic sensing of the display area and the at least one soft key, upon receipt of the touch input locking command, wherein the display area and the at least one soft key are in different sections of the touch screen.

17. The method of claim 16, further comprising:

determining whether a touch input unlocking command has been received; and enabling touch sensing of the display area and the at least one soft key, upon receipt of the touch input unlocking command.

18. The method of claim 17, wherein the touch input unlocking command is generated by applying an electromagnetic field to a predetermined part of the display area.

19. The method of claim 17, wherein disabling the touch sensing of the display area and the at least one soft key includes disabling touch sensing of a remaining area except for at least one predetermined part of the display area, and wherein the touch input unlocking command is generated by touching the predetermined part or applying an electromagnetic field to the predetermined part.

20. The method of claim 16, wherein the touch input locking command is generated by touching a predetermined part of the display area or applying an electromagnetic field to the predetermined part.

21. A touch screen comprising:

a display area;

a bezel surrounding the display area;

a first electromagnetic sensor unit disposed under the display area, for sensing an electromagnetic field incident on the display area by using a plurality of first loop units included in the first electromagnetic sensor unit, wherein each of the plurality of first loop units is overlapped with each other; and a second electromagnetic sensor unit disposed under the bezel, for sensing an electromagnetic field incident on the bezel by using at least one second loop unit included in the second electromagnetic unit, wherein the at least one second loop unit is disposed at a position corresponding to at least one soft key disposed on the bezel.

* * * * *